(12) United States Patent
Lin et al.

(10) Patent No.: US 9,902,467 B2
(45) Date of Patent: Feb. 27, 2018

(54) WAVE POWER GENERATION DEVICE AND METHOD FOR OPERATING AND MAINTAINING THE SAME

(71) Applicants: Dalian University of Technology, Dalian (CN); Yan Lin, Dalian (CN)

(72) Inventors: Yan Lin, Dalian (CN); Xiaoning Jiang, Dalian (CN); Yanyun Yu, Dalian (CN); Zhikang Zhang, Dalian (CN); Fei Pei, Dalian (CN)

(73) Assignees: DALIAN UNIVERSITY OF TECHNOLOGY, Dalian (CN); Yan Lin, Dalian (CN)

( * ) Notice: Subject to any disclaimer, the term of this patent is extended or adjusted under 35 U.S.C. 154(b) by 3 days.

(21) Appl. No.: 15/227,928

(22) Filed: Aug. 3, 2016

(65) Prior Publication Data
US 2017/0043843 A1 Feb. 16, 2017

(30) Foreign Application Priority Data
Aug. 14, 2015 (CN) .......................... 2015 1 0496081

(51) Int. Cl.
*F03B 13/00* (2006.01)
*B63B 21/50* (2006.01)
(Continued)

(52) U.S. Cl.
CPC ............. *B63B 21/50* (2013.01); *F03B 13/10* (2013.01); *F03B 13/16* (2013.01); *F15B 1/04* (2013.01); *F15B 11/08* (2013.01); *B63B 2001/128* (2013.01); *B63B 2035/4466* (2013.01); *F15B 2211/212* (2013.01); *F15B 2211/7135* (2013.01); *Y02E 10/38* (2013.01)

(58) Field of Classification Search
CPC .. F03B 13/10; F03B 13/16; F15B 1/04; B63B 2035/4466
USPC ...... 290/42, 54; 60/498, 497, 495, 496, 501, 60/502, 505; 417/330; 415/7, 906; 416/85
See application file for complete search history.

(56) References Cited

U.S. PATENT DOCUMENTS 1,018,678 A * 2/1912 Nelson .................... F02B 63/04
290/4 D
1,061,091 A * 5/1913 Lewis ................. F03B 13/1815
417/330

(Continued)

*Primary Examiner* — Julio C. Gonzalez
(74) *Attorney, Agent, or Firm* — Matthias Scholl, PC; Matthias Scholl (57) ABSTRACT

A wave power generation device, including a power generation assembly, a mooring system, a floating platform, floating towers, control cabins, a connecting member, and anti-sway plates. The floating platform is a square floating box. The power generation assembly includes a swing plate, a hydraulic cylinder, an energy accumulator, a hydraulic motor, a generator, a battery, and a power generation and distribution device. The floating platform includes a main deck. The main deck includes a manhole and a support for supporting the swing plate. The swing plate is connected to the support via a first hinge. One end of the hydraulic cylinder is connected to the swing plate, and another end of the hydraulic cylinder is connected to a floating platform. The mooring system includes four anchor windlasses. A method for operating and maintaining the wave power generation device is also provided.

5 Claims, 6 Drawing Sheets

(51) Int. Cl.
  *F03B 13/16*   (2006.01)
  *F03B 13/10*   (2006.01)
  *F15B 1/04*   (2006.01)
  *F15B 11/08*   (2006.01)
  *B63B 35/44*   (2006.01)
  *B63B 1/12*   (2006.01)

(56) References Cited

U.S. PATENT DOCUMENTS

| | | | | |
|---|---|---|---|---|
| 4,077,213 A * | 3/1978 | Hagen | F03B 13/20 | 417/331 |
| RE31,111 E * | 12/1982 | Hagen | F03B 13/20 | 417/331 |
| 4,400,940 A * | 8/1983 | Watabe | F03B 13/182 | 417/330 |
| 4,408,454 A * | 10/1983 | Hagen | F03B 13/1815 | 417/331 |
| 4,490,621 A * | 12/1984 | Watabe | F03B 13/182 | 290/42 |
| 4,580,400 A * | 4/1986 | Watabe | F03B 13/182 | 290/53 |
| 4,684,815 A * | 8/1987 | Gargos | F03B 13/20 | 290/42 |
| 4,781,023 A * | 11/1988 | Gordon | F03B 13/20 | 290/42 |
| 5,132,550 A * | 7/1992 | McCabe | B01D 61/10 | 290/42 |
| 8,004,105 B2 * | 8/2011 | Whittaker | F03B 13/182 | 290/42 |
| 8,686,582 B2 * | 4/2014 | Gardiner | F03B 13/16 | 290/42 |
| 9,115,689 B2 * | 8/2015 | Malligere | F03B 13/22 | |
| 2008/0018114 A1 * | 1/2008 | Weldon | F03B 13/181 | 290/53 |
| 2010/0038913 A1 * | 2/2010 | Svelund | F03B 13/1815 | 290/53 |
| 2011/0042954 A1 * | 2/2011 | Werjefelt | F03B 13/20 | 290/53 |
| 2011/0057448 A1 * | 3/2011 | Page | F03B 13/20 | 290/53 |
| 2012/0153627 A1 * | 6/2012 | Jo | F03B 13/20 | 290/53 |
| 2014/0230426 A1 * | 8/2014 | Tuokkola | F03B 13/16 | 60/497 |
| 2014/0248151 A1 * | 9/2014 | Dong | B63B 38/00 | 416/84 |

\* cited by examiner

WAVE POWER GENERATION DEVICE AND METHOD FOR OPERATING AND MAINTAINING THE SAME

CROSS-REFERENCE TO RELATED APPLICATIONS

Pursuant to 35 U.S.C. § 119 and the Paris Convention Treaty, this application claims the foreign priority benefit of Chinese Patent Application No. 201510496081.3 filed Aug. 14, 2015, the contents of which, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to a wave power generation device and a method for operating and maintaining the same.

Description of the Related Art

Conventional wave power generation devices have the following disadvantages: 1. the assembly process of the devices is complex; 2. the maintenance costs are high; 3. the wave/wind resistance of the devices is poor; and 4. the floating platform of the wave power generation devices tends to impede the wave energy transmission.

SUMMARY OF THE INVENTION

In view of the above-described problems, it is one objective of the invention to provide a wave power generation device comprising floating towers and a floating platform. The wave power generation device is safe, reliable, economical, and multifunctional, and features simple and novel structure, convenient operation, strong resistance to wind and wave, and high generation efficiency.

To achieve the above objective, in accordance with one embodiment of the invention, there is provided a wave power generation device, comprising a power generation assembly, control cabins, a mooring system, a floating platform, floating towers, a connecting member, and an anti-sway plate. Each control cabin comprises a control unit. The control cabins are disposed on tops of the floating towers, respectively. The floating platform is a square floating box, and comprises a main deck comprising a manhole and a support for supporting the swing plate of the power generation assembly. The power generation assembly comprises a swing plate, a hydraulic cylinder, an energy accumulator, a hydraulic motor, a generator, a battery, and a power generation and distribution device. The swing plate is connected to the support via a first hinge. One end of the hydraulic cylinder is connected to the swing plate via a second hinge. The energy accumulator, the hydraulic motor, the generator, the battery, and the power generation and distribution device are disposed in the floating platform. The swing plate drives the hydraulic cylinder, and the hydraulic cylinder is connected to the energy accumulator via a first pipe; the energy accumulator is connected to the hydraulic motor via a second pipe; the hydraulic motor drives the generator which generates electricity; then the generator is electrically connected to the battery and a transmission cable to transmit electricity to the power generation and distribution device on shore. The floating towers have an elliptic cylindrical structure, and the anti-sway plate is disposed on an outer side of the floating towers. The floating towers are symmetrically disposed around a center of the floating platform. The floating towers are fixedly connected to the floating platform via the connecting member. The mooring system comprises anchor windlasses. The anchor windlasses are disposed in the floating towers respectively, and the anchor windlasses are connected to gravity anchors via anchor chains, respectively.

In a class of this embodiment, the connecting member is a truss structure, and comprises a plurality of longitudinal rods, transverse rods, and diagonal rods; cross sections of the longitudinal rods, the transverse rods, and the diagonal rods are circular, and a joint of the diagonal rods is a spherical structure.

In a class of this embodiment, one end of the hydraulic cylinder is connected to the swing plate via the second hinge, and another end of the hydraulic cylinder is connected to the floating platform via a third hinge or to the longitudinal rods of the truss structure via a fourth hinge.

In a class of this embodiment, the floating towers each comprise a pump room, a windlass room, a chain locker, and a ballast tank; the pump room and the windlass room are disposed above a safety deck, and the anti-sway plates are disposed on an underwater part of the floating towers and face waves; each floating tower comprises a first diagonal bracing which is disposed between the floating tower and the connecting member.

In a class of this embodiment, the chain locker comprises a hawse pipe comprising an upper mouth and a lower mouth; the upper mouth of the hawse pipe is disposed on a bottom of the windlass room, and the lower mouth of the hawse pipe is disposed on a lower part of an outer wall of the floating towers; the anchor chains pass through the hawse pipe and are connect to the anchor windlasses in the windlass room.

In a class of this embodiment, the connecting member is a box bridge structure; each floating tower comprises a first diagonal bracing which is disposed between the floating tower and the box bridge structure; the box bridge structure comprises a second diagonal bracing which is disposed between the floating platform and the box bridge structure.

In a class of this embodiment, one end of the hydraulic cylinder is connected to the swing plate via the second hinge, and another end of the hydraulic cylinder is connected to the main deck of the floating platform via a fifth hinge.

It is one objective of the invention to provide a method for operating and maintaining the wave power generation device for wave energy collection and conversion, the method comprising:

1) transporting the floating platform to a work place; loading ballast water to a ballast tank to allow the floating platform to sink, so that the swing plate reaches an operating depth, and the floating platform stays in an appropriate floating state; anchoring the gravity anchors to four corners so that the floating platform faces a wave transmission direction; adjusting lengths of the anchor chains via the anchor windlasses and changing pre-tensioning forces of the anchor chains to buffer a motion response of the floating platform caused by a combined effect of wind, current, and waves;

2) collecting wave energy and converting the wave energy into electricity using the power generation assembly; storing one part of the electricity in the battery for everyday use of the floating platform, and transmitting another part of the electricity to shore through the transmission cable; and 3) when the floating platform fails, entering the control cabins on the top of the floating towers to perform maintenance or routine debugging; when the power generation assembly on the floating platform fails, loosening the anchor chains and adjusting an amount of the ballast water in the ballast tank; allowing the main deck of the floating platform to surface; entering the floating platform through the manhole on the main deck, and performing maintenance.

Advantages of the wave power generation device according to embodiments of the invention are summarized as follows.

The wave power generation device is an assembled structure comprising the floating platform, the floating towers, the connecting member, the power generation assembly, the control unit, the anti-sway plates, and the mooring system. The floating platform is the carrier of the power generation assembly. The symmetrically arranged floating towers provide buoyance force and stability for the wave power generation device. The floating platform and the floating towers are connected via the lightweight connecting member. The wave power generation device features a simple and novel structure. Whilst meeting the requirements for functions, the wave power generation device decreases the weight of the structure, saves the production cost, reduces the adverse impact of the components of the wave power generation device on the wave motion, improves the penetrability of the wave motion, and increases the efficiency of the wave energy collection. The floating towers comprise the ballast tank, the pump room, and the control unit in the control cabin, which is favorable to the adjustment of the floating state of the wave power generation device, thus ensuring the swing plate is in an optimal operating depth, and satisfying the requirements for the maintenance and towing of the wave power generation device.

The anti-sway plate is disposed on the outer side of the floating towers, which reduces the swing of the wave power generation device. The connecting member is connected to the floating towers and the floating platform, and the joints thereof are provided with diagonal bracings, which guarantees the intensity and security of the wave power generation device. The radial mooring system is economical, reliable and easy to operate, and increases the wind/current/wave resistance of the wave power generation device. The wave power generation device is safe, reliable, economical and multifunctional, and features simple and novel structure, convenient operation, and high generation efficiency.

BRIEF DESCRIPTION OF THE DRAWINGS

The invention is described hereinbelow with reference to the accompanying drawings, in which.

In the drawings, the following reference numbers are used: 1. Floating platform; 1a. Main deck; 1b. Manhole; 2. Support for supporting swing plate; 3. Power generation assembly; 3a. Swing plate; 3b. Hydraulic cylinder; 3c. Energy accumulator; 3d. Hydraulic motor; 3e. Generator; 3f. Battery; 3g. Power generation and distribution device; 4. Floating tower; 4a. Safety deck; 4b. First diagonal bracing; 5. Control cabin; 5a. Control unit; 6. Pump room; 7. Windlass room; 8. Chain locker; 9. Ballast tank; 10. Anti-sway plate; 11. Connecting member; 11a. Longitudinal rod; 11b. Transverse rod; 11c. Diagonal rod; 11d. Spherical structure; 11e. Box bridge structure; 11f. Second diagonal bracing; 12. Anchor windlasses; 13. Hawse pipe; 13a. Upper mouth; 13b. Lower mouth; 14. Anchor chain; 15. Gravity anchor; and 16. Transmission cable.

DETAILED DESCRIPTION OF THE EMBODIMENTS

For further illustrating the invention, experiments detailing a wave power generation device comprising floating towers and a floating platform and a method for operating and maintaining the same for wave energy collection and conversion are described below. It should be noted that the following examples are intended to describe and not to limit the invention.

FIGS. 1-4 are schematic diagrams of a wave power generation device having a connecting member in a truss structure. The wave power generation device comprises a floating platform 1, floating towers 4, a connecting member 11, a power generation assembly 3, a control unit 5a, a mooring system, and an anti-sway device. The floating platform 1 is a square floating box and is a carrier of the power generation assembly 3. The floating platform comprises a main deck 1a comprising a manhole 1b and a support 2 for supporting a swing plate 3a. One end of the hydraulic cylinder 3b is connected to the swing plate 3a via a first hinge, and another end of the hydraulic cylinder is connected to longitudinal rods 11a via a second hinge. The floating towers 4 are symmetrically disposed around a center of the floating platform 1. In this example, the floating towers are four in number and fixedly connected to the floating platform via the connecting member 11, thus ensuring the floatation and stability of the wave power generation device. The connecting member 11 is a truss structure, and comprises a plurality of longitudinal rods 11a, transverse rods 11b, and diagonal rods 11c. Cross sections of the longitudinal rods, the transverse rods, and the diagonal rods are circular, and a joint of the diagonal rods is a spherical structure. Anti-sway plates 10 are disposed on a lower part of the floating towers and face the waves, which can reduce the swing of the wave power generation device and ensure the wave energy conversion efficiency. A control cabin 5 is disposed on the top of each of the floating towers 4, and the control cabin comprises the control unit 5a, life-saving equipment, navigation and communication equipment, and fire equipment. The floating towers comprises first diagonal bracings 4b disposed between the floating towers 4 and the connecting member 11 to ensure the intensity of the wave power generation device structure. The mooring system is radial, and is centrosymmetrically distributed. In the mooring system, the anchor chains 14 are coordinated with the gravity anchors 12.

Figure 1:
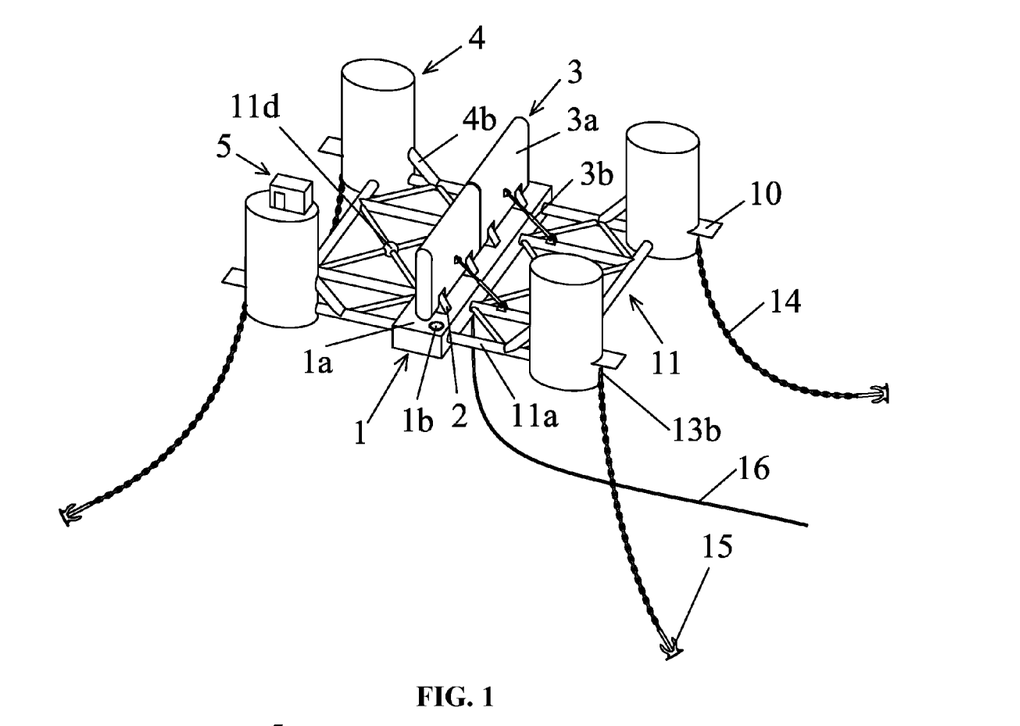
FIG. 1 is a stereogram of a wave power generation device having a connecting member in a truss structure in accordance with one embodiment of the invention.
Figure 2:
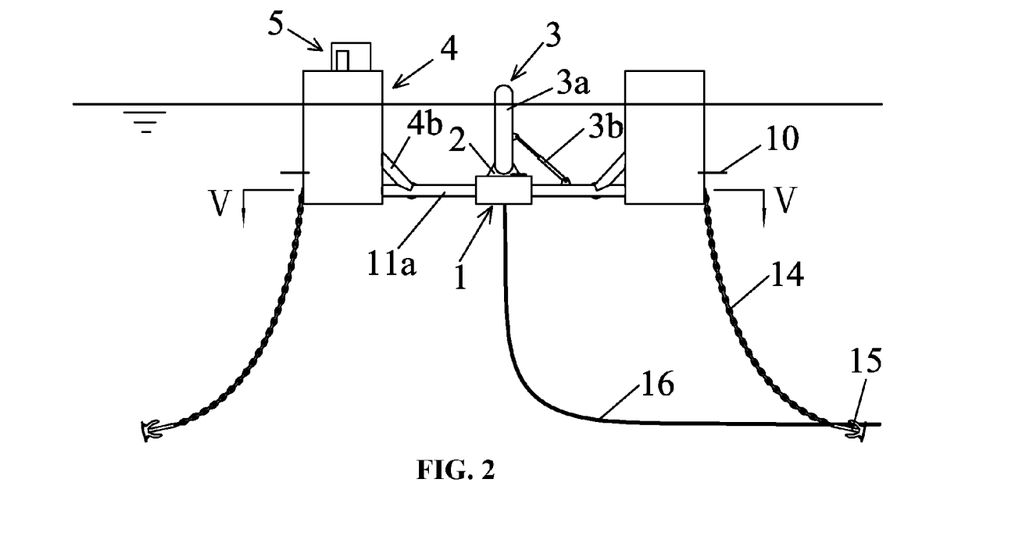
FIG. 2 is a front view of a wave power generation device having a connecting member in a truss structure in accordance with one embodiment of the invention.
Figure 3:
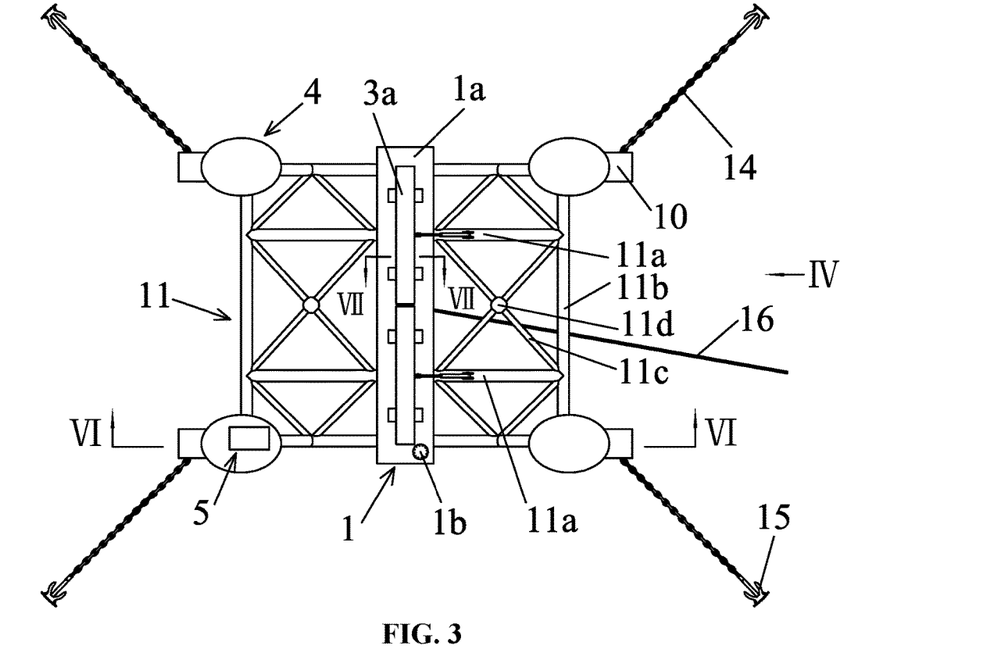
FIG. 3 is a top view of a wave power generation device having a connecting member in a truss structure in accordance with one embodiment of the invention.
Figure 4:
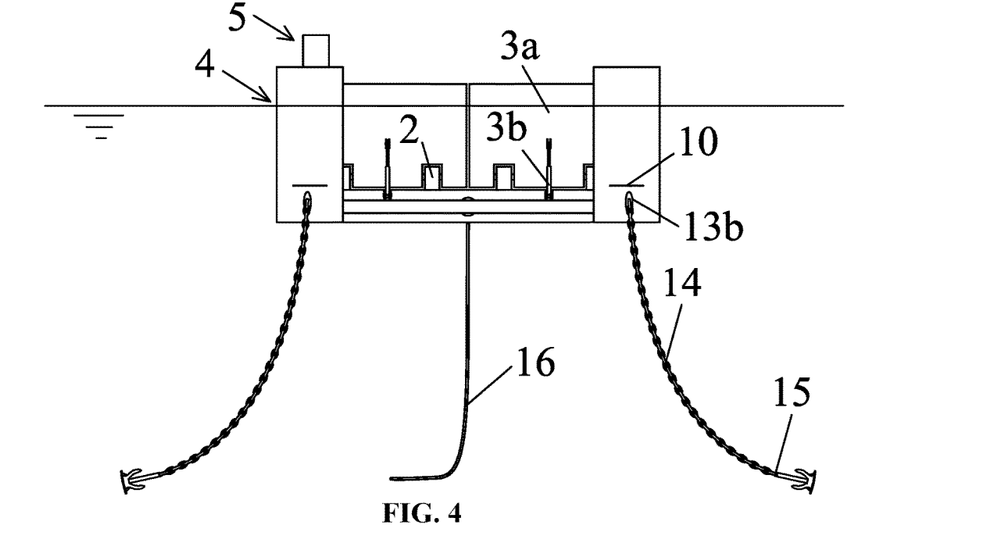
FIG. 4 is diagram of a wave power generation device taken from direction IV in FIG. 3.
Figure 5:
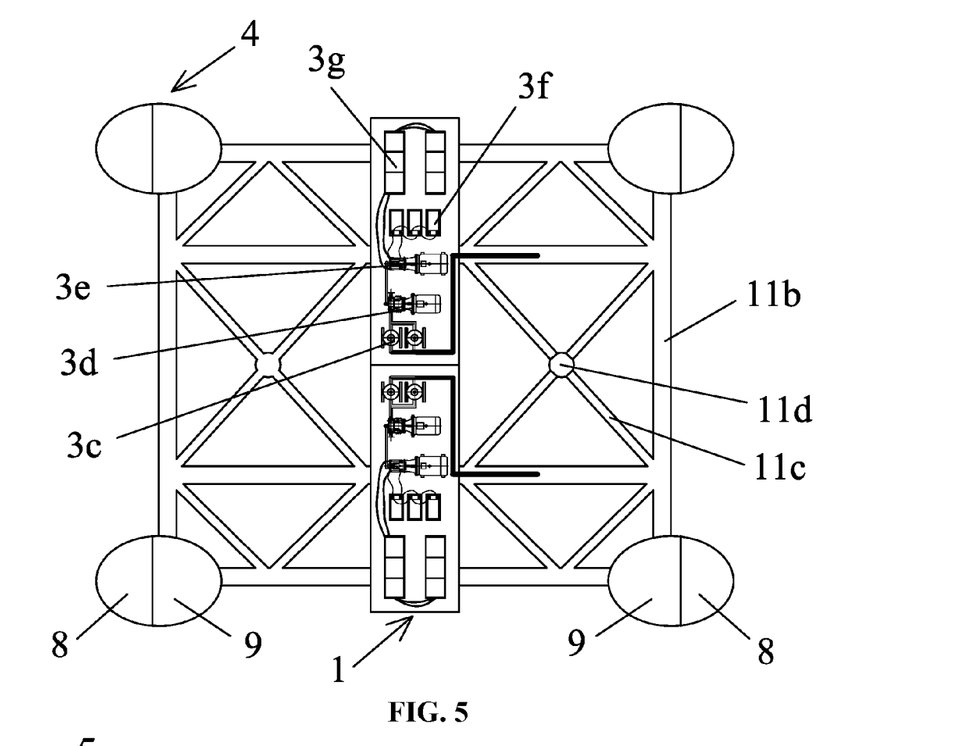
FIG. 5 is a cross-sectional view taken from line V-V in FIG. 2.
Figure 6:
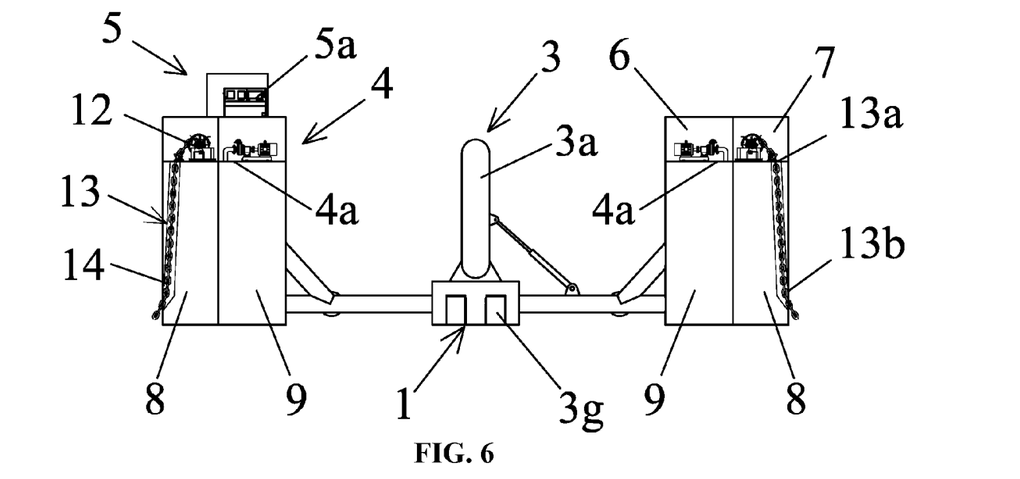
FIG. 6 is a cross-sectional view taken from line VI-VI in FIG. 3.

FIGS. 5-6 demonstrate the internal structure of the wave power generation device. The power generation assembly 3 is partly disposed in the floating platform 1, and comprises an energy accumulator 3c, a hydraulic motor 3d, a generator 3e, a battery 3f, and a power generation and distribution device 3g. The swing plate 3a drives the hydraulic cylinder 3b to store pressure in the energy accumulator 3c, and the energy accumulator 3c drives the hydraulic motor 3d to rotate, and the generator 3e is actuated and generates electricity. One part of the electricity is stored in the battery 3f for everyday use of the wave power generation device, and another part of the electricity is transmitted to shore through the transmission cable 16 by the power generation and distribution device 3g. The floating towers 4 comprise a pump room 6, a windlass room 7, a chain locker 8, and a ballast tank 9. The pump room 6 and the windlass room 7 are disposed above a safety deck 4a. The chain locker 8 comprises a hawse pipe 13. The hawse pipe comprises an upper mouth 13a and a lower mouth 13b; the upper mouth 13a of the hawse pipe is disposed on a bottom of the windlass room, and the lower mouth 13b of the hawse pipe is disposed on a lower part of an outer wall of the floating towers. The anchor chains pass through the hawse pipe and are connect to the anchor windlasses in the windlass room. One end of the anchor chains 14 is connected to the gravity anchors 15 which is underwater, and another end of the anchor chains passes through the hawse pipe 13 and is connect to the anchor windlasses 12 in the windlass room 7.

Figure 7:
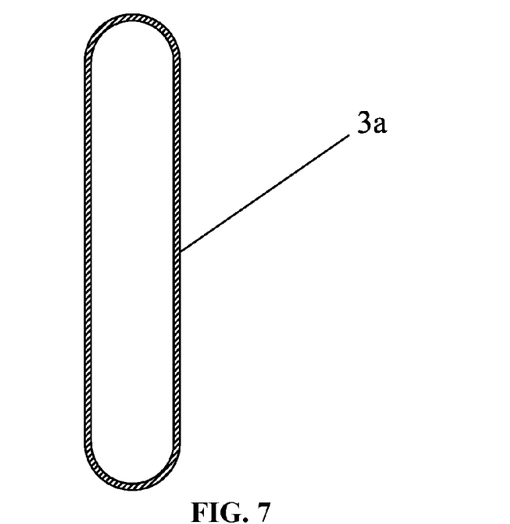
FIG. 7 is a cross-sectional view taken from line VII-VII in FIG. 3.

FIG. 7 is a cross-sectional view of the swing plate 3a. The swing plate is hollow and watertight, and can generate buoyancy force in the operating depth. When the swing plate deviates from an original position due to an effect of the waves, a restoring force is produced accordingly.

Figure 8:
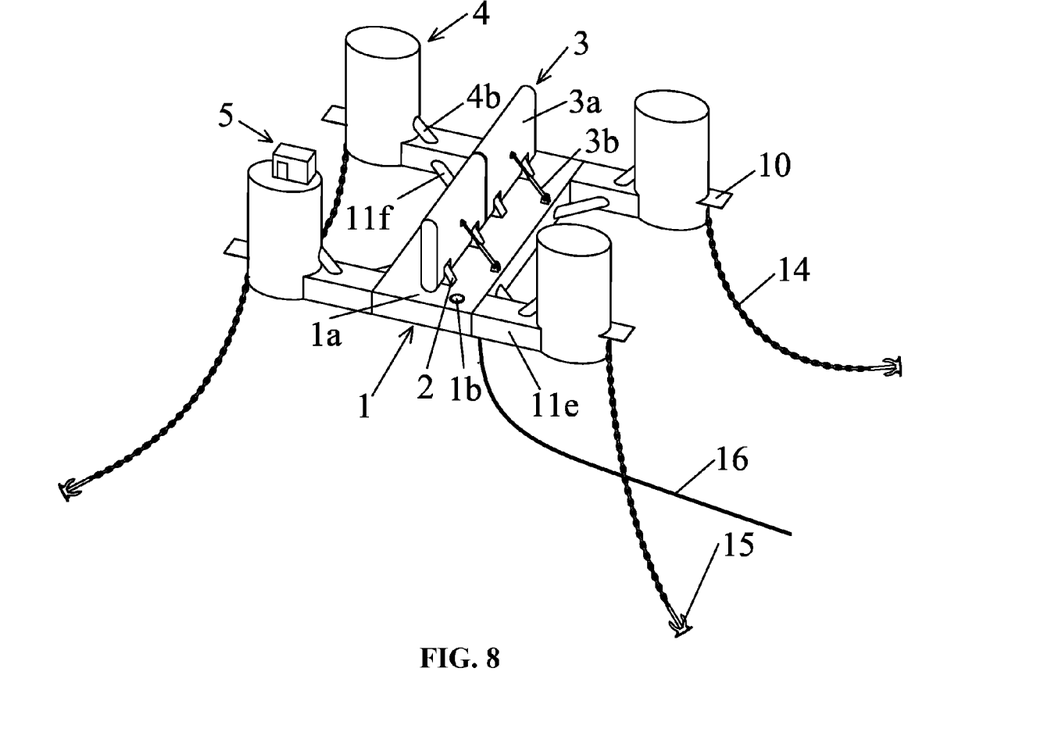
FIG. 8 is a schematic diagram of a wave power generation device having a connecting member in a box bridge structure in accordance with one embodiment of the invention.
Figure 9:
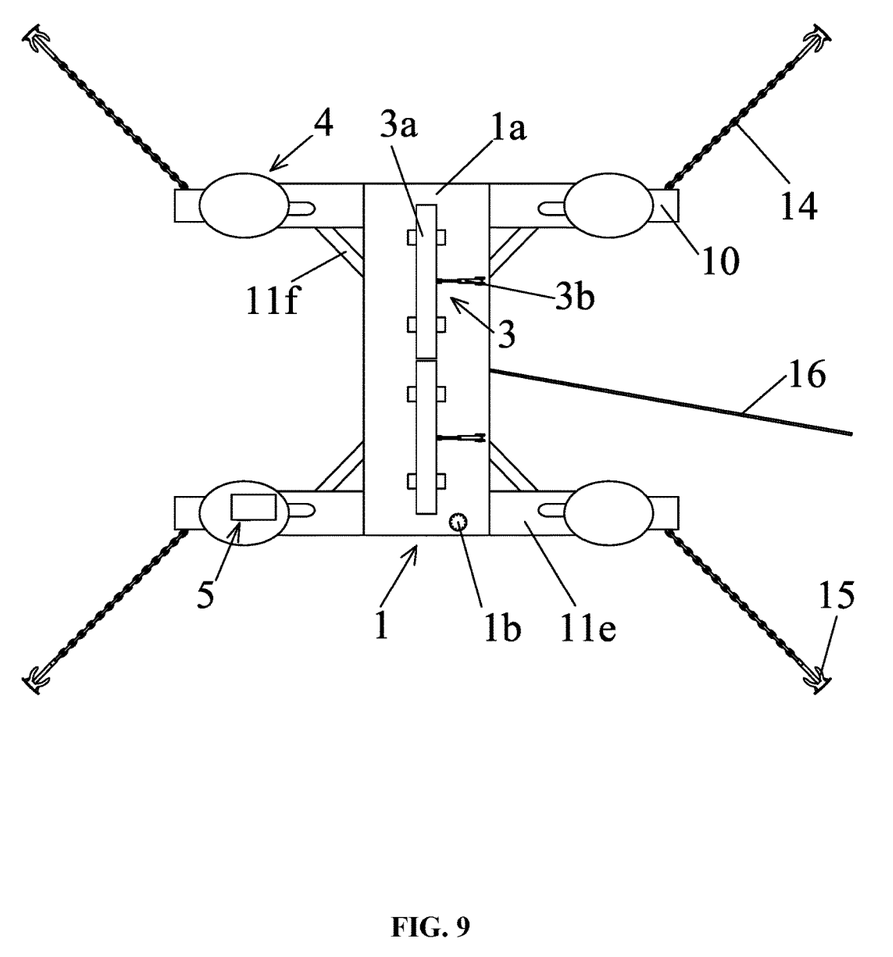
FIG. 9 is a front view of a wave power generation device having a connecting member in a box bridge structure in accordance with one embodiment of the invention.

FIGS. 8-9 are schematic diagrams of a wave power generation device having a connecting member in a box bridge structure. The connecting member 11 features a box bridge structure lie, which can be employed as a ballast tank, a buoyancy tank, or channels, etc. The box bridge structure is symmetrically disposed around the floating platform 1. The floating towers 4 are connected to the floating platform 1 via the box bridge structure, and the floating platform is a groove structure, so as to reduce the adverse impact of the floating platform on the wave motion. The floating towers comprises first diagonal bracings 4b disposed between the floating towers 4 and the box bridge structure lie, and the box bridge structure comprises a second diagonal bracing 11f disposed between the floating platform 1 and the box bridge structure, so as to intensify the box bridge structure, and ensure the security of the wave power generation device. One end of the hydraulic cylinder 3b is connected to the swing plate 3a via the first hinge, and another end of the hydraulic cylinder is connected to the main deck 1a of the floating platform 1 via a third hinge.

Figure 10:
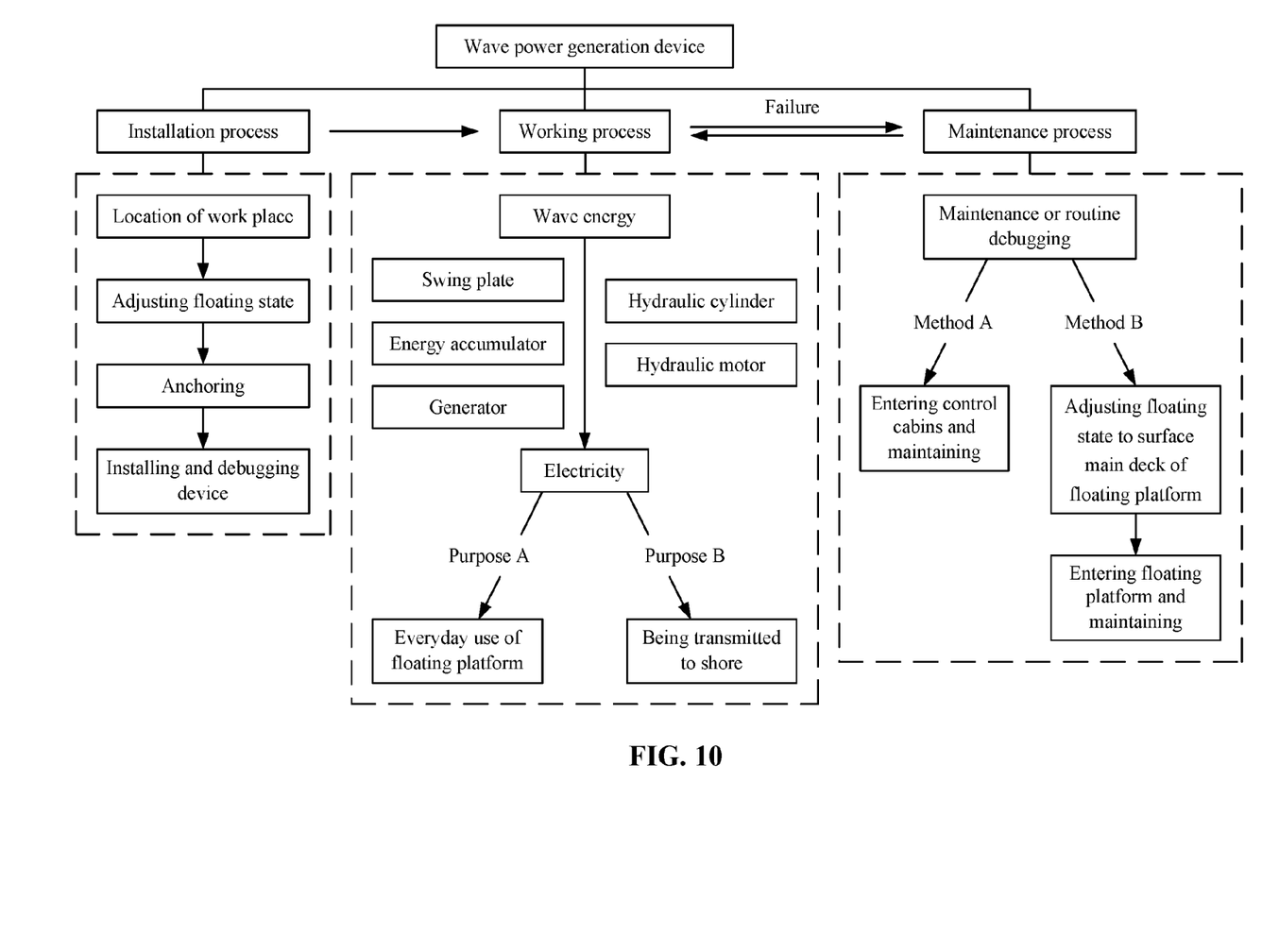
FIG. 10 is a flow chart of a method for operating and maintaining a wave power generation device in accordance with one embodiment of the invention.

FIG. 10 is a flow chart of a method for operating and maintaining a wave power generation device. The method comprises:
1) Installation process: transporting the wave power generation device to a work place using a semisubmersible barge or a tug boat; loading ballast water to a ballast tank to allow the floating platform to sink, so that the swing plate reaches an operating depth, and the floating platform stays in an appropriate floating state; anchoring the gravity anchors to four corners using a platform support vessel so that the mooring system is radial, and the wave power generation device faces the wave transmission direction; adjusting lengths of the anchor chains via the anchor windlasses and changing pretensioning forces of the anchor chains to buffer a motion response of the floating platform caused by a combined effect of wind, current, and waves;
2) Working process: collecting wave energy and converting the wave energy into electricity using the power generation assembly; storing one part of the electricity in the battery for everyday use of the floating platform, and transmitting another part of the electricity to shore through the transmission cable; and
3) Maintenance process: when the floating platform fails, entering the control cabins on the top of the floating towers to perform maintenance or routine debugging; when the power generation assembly on the floating platform fails, loosening the anchor chains and adjusting an amount of the ballast water in the ballast tank; allowing the main deck of the floating platform to surface; entering the floating platform through the manhole on the main deck, and performing maintenance.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A wave power generation device, comprising:
    a power generation assembly, the power generation assembly comprising a swing plate, a hydraulic cylinder, an energy accumulator, a hydraulic motor, a generator, a battery, and a power generation and distribution device;
    a mooring system, the mooring system comprising anchor windlasses;
    a floating platform, the floating platform comprising a main deck; the main deck comprising a manhole and a support for supporting the swing plate of the power generation assembly;
    floating towers;
    control cabins, the control cabins being disposed on tops of the floating towers, respectively, and each control cabin comprising a control unit;
    a connecting member; and
    anti-sway plates;
    wherein:
        the floating platform is a square floating box;
        the swing plate is connected to the support via a first hinge;
        one end of the hydraulic cylinder is connected to the swing plate via a second hinge;
        the energy accumulator, the hydraulic motor, the generator, the battery, and the power generation and distribution device are disposed in the floating platform;
        the swing plate is configured to drive the hydraulic cylinder which is connected to the energy accumulator via a first pipe; the energy accumulator is adapted to receive pressure from the hydraulic cylinder and is connected to the hydraulic motor via a second pipe; in operation, the generator is driven by the hydraulic motor and generates electricity; the generator is electrically connected to the battery and transmits electricity to the power generation and distribution device via a transmission cable;

the floating towers have an elliptic cylindrical structure, and the anti-sway plates are disposed on an outer side of the floating towers, respectively; the floating towers are symmetrically disposed around a center of the floating platform; the floating towers are fixedly connected to the floating platform via the connecting member;

the anchor windlasses are disposed in the floating towers respectively, and the anchor windlasses are connected to gravity anchors via anchor chains, respectively; and the connecting member is a truss structure, and comprises a plurality of longitudinal rods, transverse rods, and diagonal rods; cross sections of the longitudinal rods, the transverse rods, and the diagonal rods are circular, and a joint of the diagonal rods is a spherical structure.

2. The device of claim 1, wherein one end of the hydraulic cylinder is connected to the swing plate via the second hinge, and another end of the hydraulic cylinder is connected to the floating platform via a third hinge or to the longitudinal rods of the truss structure via a fourth hinge.

3. A wave power generation device, comprising:
a power generation assembly, the power generation assembly comprising a swing plate, a hydraulic cylinder, an energy accumulator, a hydraulic motor, a generator, a battery, and a power generation and distribution device;
a mooring system, the mooring system comprising anchor windlasses;
a floating platform, the floating platform comprising a main deck; the main deck comprising a manhole and a support for supporting the swing plate of the power generation assembly;
floating towers;
control cabins, the control cabins being disposed on tops of the floating towers, respectively, and each control cabin comprising a control unit;
a connecting member; and
anti-sway plates;
wherein:
the floating platform is a square floating box;
the swing plate is connected to the support via a first hinge;
one end of the hydraulic cylinder is connected to the swing plate via a second hinge;
the energy accumulator, the hydraulic motor, the generator, the battery, and the power generation and distribution device are disposed in the floating Platform;
the swing plate is configured to drive the hydraulic cylinder which is connected to the energy accumulator via a first pipe; the energy accumulator is adapted to receive pressure from the hydraulic cylinder and is connected to the hydraulic motor via a second pipe; in operation, the generator is driven by the hydraulic motor and generates electricity; the generator is electrically connected to the battery and transmits electricity to the power generation and distribution device via a transmission cable;
the floating towers have an elliptic cylindrical structure, and the anti-sway plates are disposed on an outer side of the floating towers, respectively; the floating towers are symmetrically disposed around a center of the floating platform; the floating towers are fixedly connected to the floating platform via the connecting member;
the anchor windlasses are disposed in the floating towers respectively, and the anchor windlasses are connected to gravity anchors via anchor chains, respectively; and
the floating towers each comprise a pump room, a windlass room, a chain locker, and a ballast tank; the pump room and the windlass room are disposed above a safety deck, and the anti-sway plates are disposed on an underwater part of the floating towers and face waves; each floating tower comprises a first diagonal bracing which is disposed between the floating tower and the connecting member.

4. The device of claim 3, wherein the chain locker comprises a hawse pipe comprising an upper mouth and a lower mouth; the upper mouth of the hawse pipe is disposed on a bottom of the windlass room, and the lower mouth of the hawse pipe is disposed on a lower part of an outer wall of the floating towers; the anchor chains pass through the hawse pipe and are connect to the anchor windlasses in the windlass room.

5. A wave power generation device, comprising:
a power generation assembly, the power generation assembly comprising a swing plate, a hydraulic cylinder, an energy accumulator, a hydraulic motor, a generator, a battery, and a power generation and distribution device;
a mooring system, the mooring system comprising anchor windlasses;
a floating platform, the floating platform comprising a main deck; the main deck comprising a manhole and a support for supporting the swing plate of the power generation assembly;
floating towers;
control cabins, the control cabins being disposed on tops of the floating towers, respectively, and each control cabin comprising a control unit;
a connecting member; and
anti-sway plates;
wherein:
the floating platform is a square floating box;
the swing plate is connected to the support via a first hinge;
one end of the hydraulic cylinder is connected to the swing plate via a second hinge;
the energy accumulator, the hydraulic motor, the generator, the battery, and the power generation and distribution device are disposed in the floating platform;
the swing plate is configured to drive the hydraulic cylinder which is connected to the energy accumulator via a first pipe; the energy accumulator is adapted to receive pressure from the hydraulic cylinder and is connected to the hydraulic motor via a second pipe; in operation, the generator is driven by the hydraulic motor and generates electricity; the generator is electrically connected to the battery and transmits electricity to the power generation and distribution device via a transmission cable;
the floating towers have an elliptic cylindrical structure, and the anti-sway plates are disposed on an outer side of the floating towers, respectively; the floating towers are symmetrically disposed around a center of the floating platform; the floating towers are fixedly connected to the floating platform via the connecting member;

the anchor windlasses are disposed in the floating towers respectively, and the anchor windlasses are connected to gravity anchors via anchor chains, respectively; and the connecting member is a box bridge structure; each floating tower comprises a first diagonal bracing which is disposed between the floating tower and the box bridge structure; the box bridge structure comprises a second diagonal bracing which is disposed between the floating platform and the box bridge structure.

* * * * *